US008149680B2

United States Patent
Rao et al.

(10) Patent No.: US 8,149,680 B2
(45) Date of Patent: Apr. 3, 2012

(54) RANDOM READ/WRITE PERFORMANCE OF PROBE STORAGE MEMORY DEVICES

(75) Inventors: Valluri R. Rao, Saratoga, CA (US); Sanjay Rangan, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/650,583

(22) Filed: Dec. 31, 2009

(65) Prior Publication Data

US 2010/0226237 A1    Sep. 9, 2010

Related U.S. Application Data

(60) Provisional application No. 61/142,163, filed on Dec. 31, 2008.

(51) Int. Cl.
*G11B 7/00* (2006.01)

(52) U.S. Cl. ........................................ 369/126; 369/100

(58) Field of Classification Search .................... None
See application file for complete search history.

(56) References Cited

U.S. PATENT DOCUMENTS

| 7,483,362 B2 * | 1/2009 | Ishii et al. ............... 369/126 |
| 7,489,618 B2 * | 2/2009 | Min et al. ............... 369/126 |
| 2010/0014412 A1 * | 1/2010 | Maeda et al. ............... 369/126 |

* cited by examiner

*Primary Examiner* — Muhammad N Edun
(74) *Attorney, Agent, or Firm* — Kevin A. Reif

(57) ABSTRACT

Current probe-type memory architecture assumes that the minimum chunk of data that a probe tip can access is one entire track and perhaps only four out of five-thousand, for example, probes participate in the access thereby degrading performance. By subdividing the track into D finer chunks or data zones, D times more probes can cooperate to read out the data, hence increasing the data throughput by Dx. Each tip now only scans approximately one Dth of the track and hence the scan time is reduced by a factor D, while D probes are being utilized in parallel.

4 Claims, 10 Drawing Sheets

RANDOM READ/WRITE PERFORMANCE OF PROBE STORAGE MEMORY DEVICES

CROSS-REFERENCE TO RELATED APPLICATIONS

This application is related, and claims priority to, U.S. Provisional Application Ser. No. 61/142,163 titled RANDOM READ/WRITE PERFORMANCE OF PROBE STORAGE MEMORY DEVICES, filed on Dec. 31, 2008, which is herein incorporated by reference.

FIELD OF THE INVENTION

Embodiments of the present invention are directed to probe-type memory storage devices and, more particularly, to techniques for improving read/write performance and long term reliability of such devices.

BACKGROUND INFORMATION

Probe storage memories (also known as Seek and Scan Probe or SSP memories) are a type of chip scale mass storage devices in which read/write access to the memory cells is achieved micro-mechanically by moving read/write heads over the storage medium. The memory cells in the storage medium are not lithographically defined as in conventional semiconductor memories, but rather are created or read as sea of bits with a precision set by the accuracy and resolution of the micro-mechanical system that positions the read-write heads. Parallelism in the form of multiple read write heads is often used to combat the micro-scale distance traveled by the precision micro-mechanical movers. In addition since high capacity is needed in chip scale formats, the arial density of the storage media also needs to be high and is typically >2 Tbits/in$^2$. Compared to semiconductor memories the cost/bit of probe storage can be lower as it does not require advanced lithography and the micromechanical access system can be fabricated on older semiconductor technologies. Typical probe based memories include storage media made of materials that can be electrically switched between two or more states having different electrical characteristics such as resistance, polarization dipole direction, or some other characteristic.

SSP memories are written to by passing an electric current through the storage media or applying an electric field to the storage media. Passing a current through the storage media, or applying an electric field to the media, is typically accomplished by applying a voltage between a sharp probe tip on one side of the storage media and an electrode on the other side of the storage media. Current SSP memories use probe tips positioned on a free end of one or more MEMS probes. In an idle state each MEMS probe maintains the probe tip at a certain distance from the storage media, but before the electric field or current can be applied to the storage media the probe tip must usually be brought close to, or in some cases in direct contact with, the storage media.

FIG. 1 illustrates the basic concept of a probe storage device and compares a probe storage device with a semiconductor memory. On the left is a conventional memory with memory cells addressable by word lines and bit lines. On the right is a SPP memory where bits are stored on a media on a moving sled read by probes. FIGS. 2A and 2B illustrate an SSP memory configuration in which an array of cantilever probes are anchored to a substrate (the cantilever wafer), and can be actuated to contact or de-contact the storage media on a mover that carries a storage media and is positioned over the cantilever wafer.

FIGS. 3A and 3B illustrate how data bits are organized in the storage medium the form of tracks. The data tracks are stored in the storage media in one of two ways, depending on how the media mover scans relative to the cantilever tips. FIG. 3A illustrates axial scanning, where data is stored in the storage media in-line with the cantilever direction, such that the mover scans in the direction parallel to a longitudinal axis of the cantilever to read/write/erase (R/W/E) each data track. FIG. 3B illustrates transverse scanning, where the media mover scans in a direction perpendicular to the longitudinal axis of the cantilever probe to R/W/E each data track; data is consequently stored in lines that are transverse to the cantilever's longitudinal axis.

BRIEF DESCRIPTION OF THE DRAWINGS

The foregoing and a better understanding of the present invention may become apparent from the following detailed description of arrangements and example embodiments and the claims when read in connection with the accompanying drawings, all forming a part of the disclosure of this invention. While the foregoing and following written and illustrated disclosure focuses on disclosing arrangements and example embodiments of the invention, it should be clearly understood that the same is by way of illustration and example only and the invention is not limited thereto.

DETAILED DESCRIPTION

Probe based memory devices possess massive amounts of internal parallelism in the form of multiple Read/Write channels implemented as one probe tip/channel. The embodiments below are ways to take full advantage of this parallelism to maximize random and sequential data requests to the device.

Figure 1:
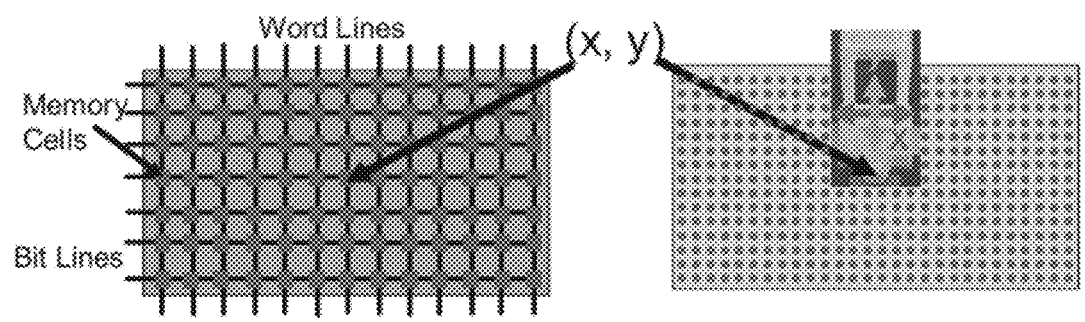
FIG. 1. Illustrates the concept of probe storage also referred to as Seek and Scan Probe (SSP) and compares it with a semiconductor memory device.
Figure 2A:
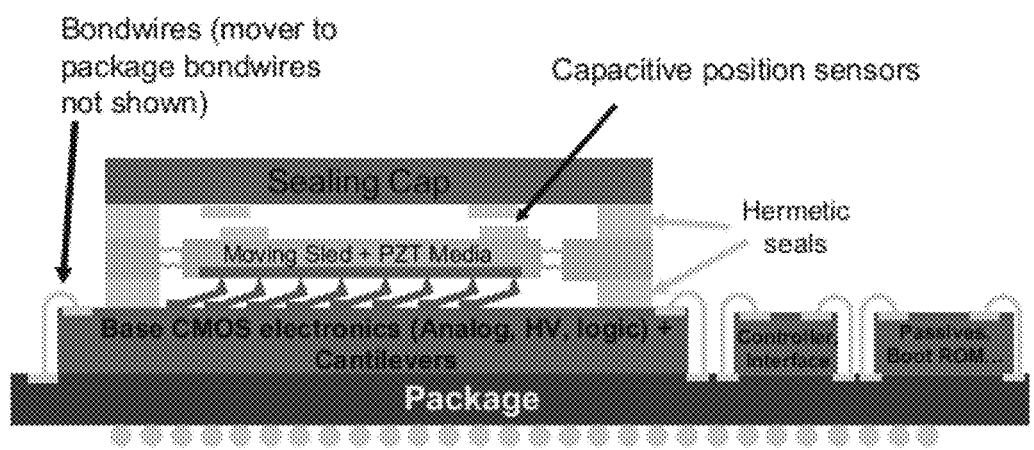
FIG. 2A shows one embodiment of a probe storage/SSP device.
Figure 2B:
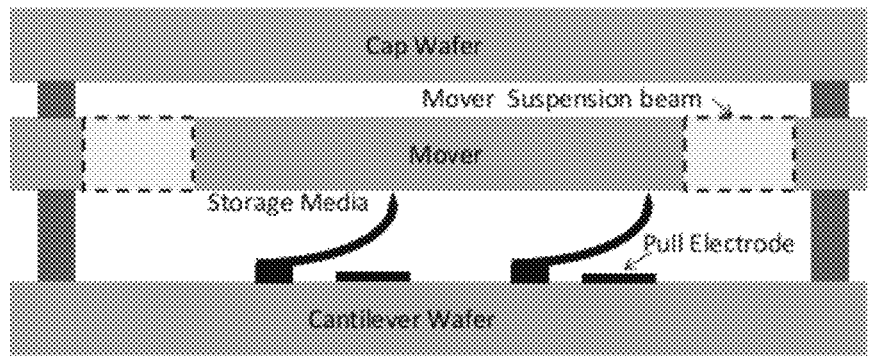
FIG. 2B is a side elevation of an embodiment of a seek-scan probe (SSP) memory.
Figure 3A:
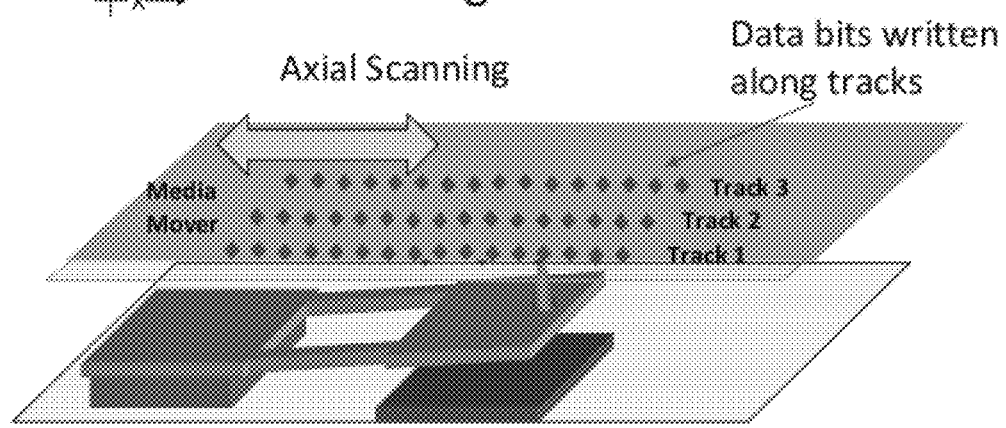
FIG. 3A is a perspective view illustrating axial scanning in the embodiment of an SSP memory shown in FIG. 2A.
Figure 3B:
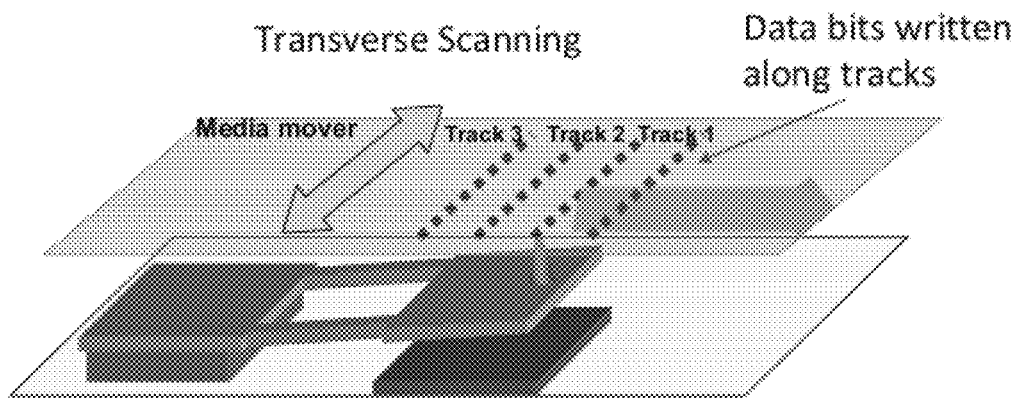
FIG. 3B is a perspective view illustrating transverse scanning in the embodiment of an SSP memory shown in FIG. 2A.
Figure 4:
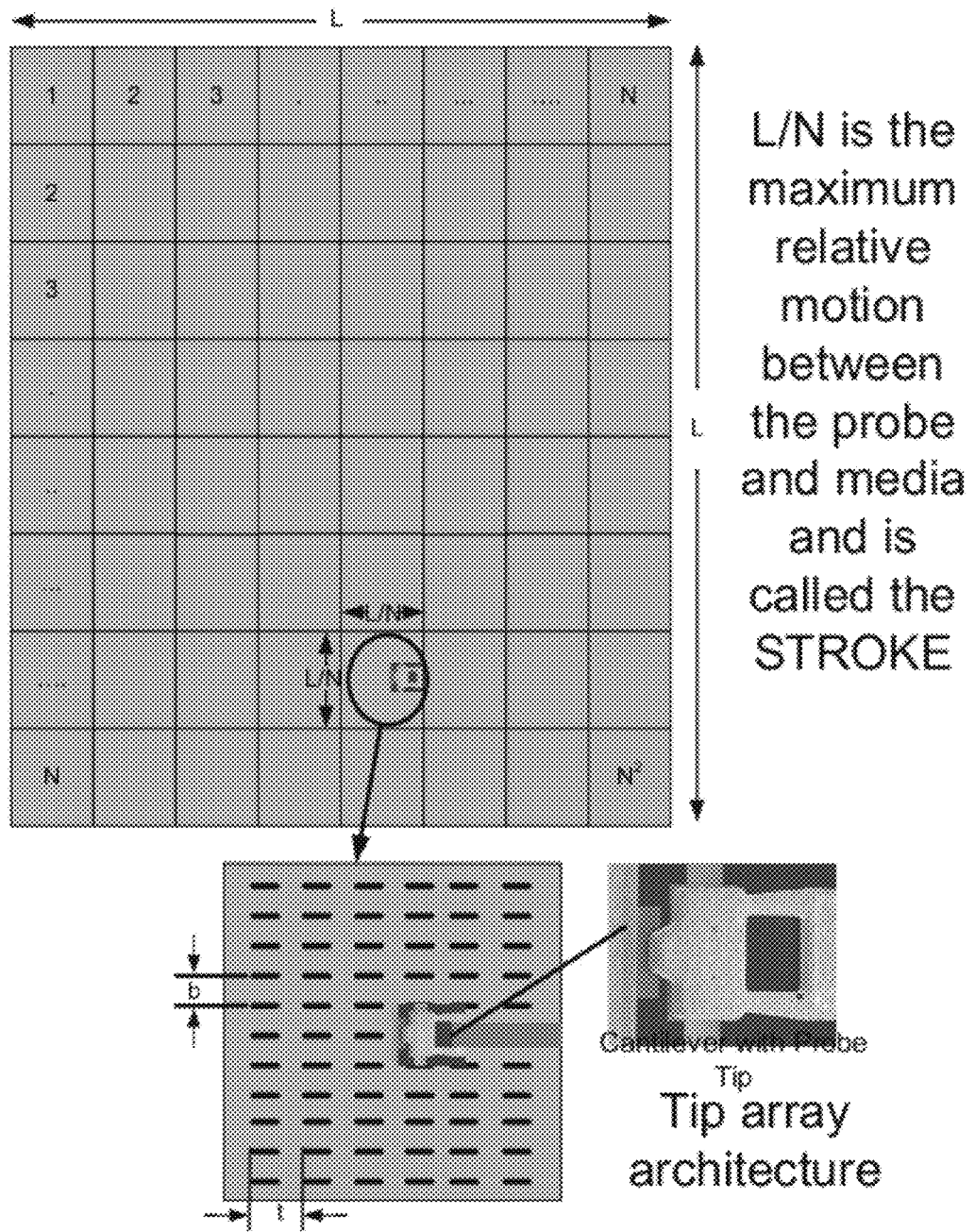
FIG. 4 is a diagram showing a square storage media having size L×L, wherein each probe is responsible for covering a piece of the media with dimensions L/N×L/N.

Referring now to FIG. 4, if the probes are laid out in a two dimensional array (N rows by N columns) and a square storage media has size is L×L, then each probe is responsible for covering a piece of the media with dimensions L/N×L/N. Within the area covered by one probe the data is stored in tracks. If the track pitch is t, there are (L/N)/t tracks. Along a track, if the bit pitch is b, then there are (L/N)/b bits per track. Hence the total number of bits serviced by one probe is $(L/N)^2/(bt)$. Since all the probes in one device move together in two dimensions, it is mandatory that for a given micromover location, every probe is at the same track and bit locations within its scan area.

This restriction poses some limitations to the number of Random Input/Output data operations (IOPS) that can be serviced even though the probe count can be as high as 5000 or more. This high degree of parallelism however is highly beneficial for sequential data accesses. To address these issues embodiments are directed to improving the granularity of the minimum data chunks accessed in an SPP memory device to maximize the number of probes that can cooperate in a data read operation and by creating a hierarchy of grouping and clustering of the read/write heads to enable optimal handling of different request sizes. It should also be noted that even though, all the probes in one device are forced to move together, mechanically, each can be independently addressed electrically through dedicated electronics provided for each cantilever. This means that there is complete freedom to choose which probes are reading and which are writing simultaneously leading to overlapping reads and writes. This is a powerful capability that is not possible with semiconductor memories or disk drives which typically have only one read/write channel. This architecture also reduces probe tip wear.

All probes on the media are servicing host read/write requirements and there is no unnecessary loss of tip lifetime. In other embodiments, the traditional single mover architecture may be split into a multi-mover or multi-core architecture to provide independent motion for groups of cantilevers. The overlapping reads and writes can further enhance these multi core implementations.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Current probe-type memory architecture assumes that the minimum chunk of data that a probe tip can access is one entire track. For example, with a 17 nm bit pitch and a scan length/probe equal to 150 μm one track can store approximately 1 KB of data (including the overhead for formatting and Error Correction bits). This means that for a 4 KB request only 4 tips are used to obtain the data, thereby severely degrading the inherent parallelism possible. If the total number of probe tips in the device is 5000, then 4996 tips are idle during the request. A second request cannot be serviced until the first request is completed, and this wait time is the seek time and the time to scan one complete track.

Figure 5:
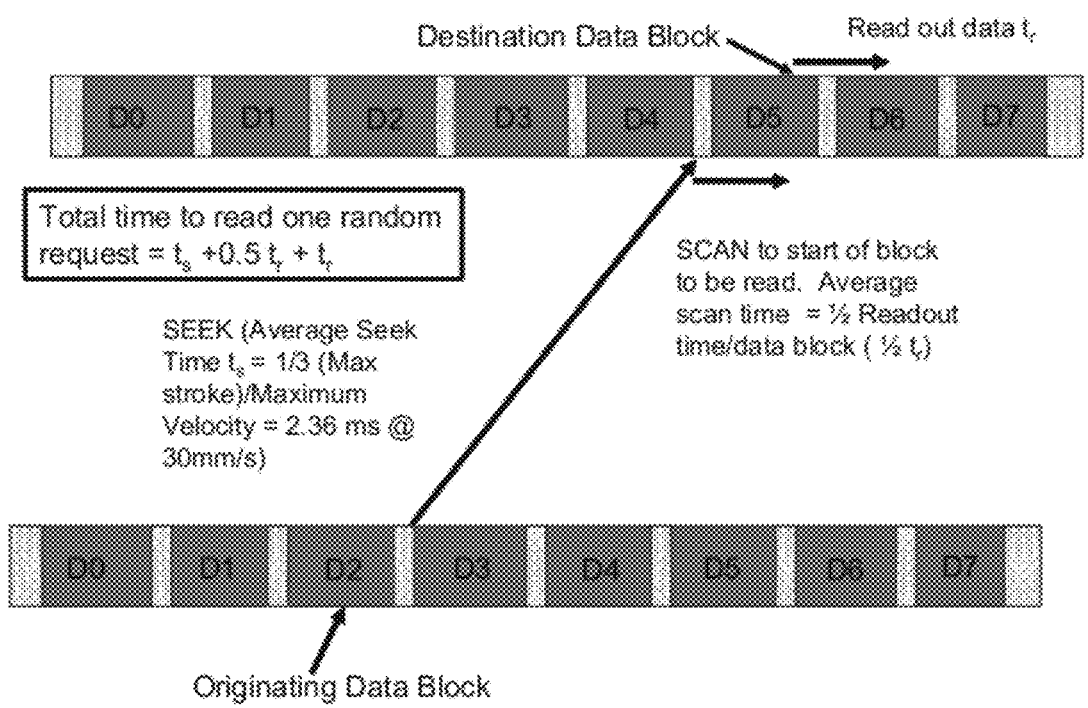
FIG. 5 is a diagram illustrating the further subdivision of each track into smaller data blocks size D.

As shown in FIG. 5, by subdividing the track into D finer chunks or data zones, D times more probes can cooperate to read out the data, hence increasing the data throughput by Dx. Each tip now only scans approximately one Dth of the track and hence the scan time is reduced by a factor D, while D probes are being utilized in parallel. However, if D is too large, the seek time to get to the data zone becomes much larger that the scan time and the performance saturates due to the seek time limitations of the system.

Figure 6:
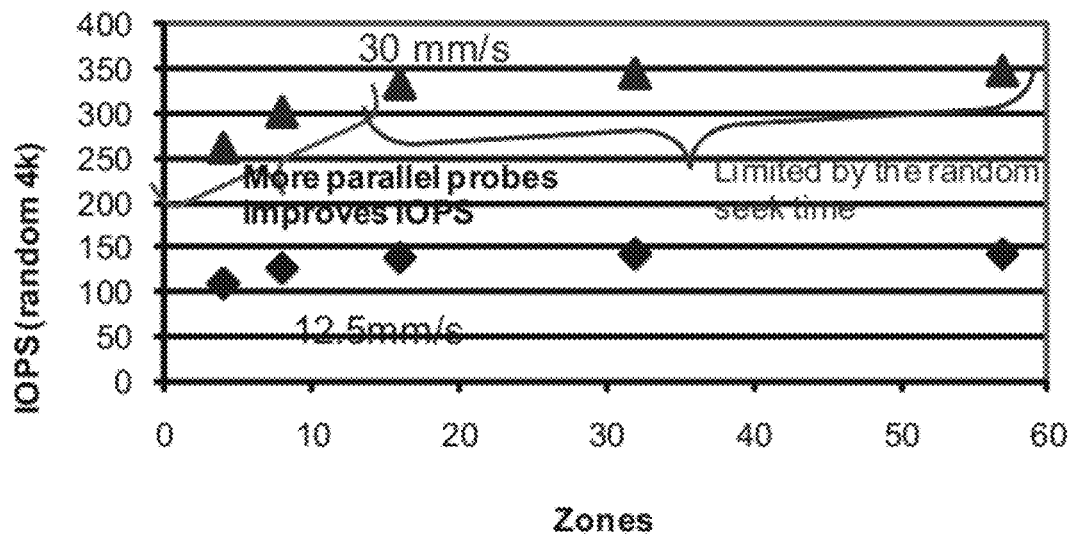
FIG. 6 is a graph illustrating the impact to the seek and scan times improvement for the case when the tracks are subdivided into a number of data zones.

FIG. 6 shows graphs illustrating the above for the case of a mover traveling at 30 mm/s and 12.5 mm/s with sequential data rates of 78 MB/s or 28 MB/s, respectively, for up to 57 zones per track, a total of 350 probes and a request size of 4 KB. As shown, as the number of data zones/track (D) is increased, from D=1 to about D=20 there is improvement in IOPS since there are more probes being used in parallel which travel a shorter distance giving an overall shorter Seek+Scan time leading to more requests being serviced/second. However, if a track is further subdivided and the number of zones increase beyond 20 that, there is only marginal improvement since speed is then limited by the random seek time.

Figure 7:
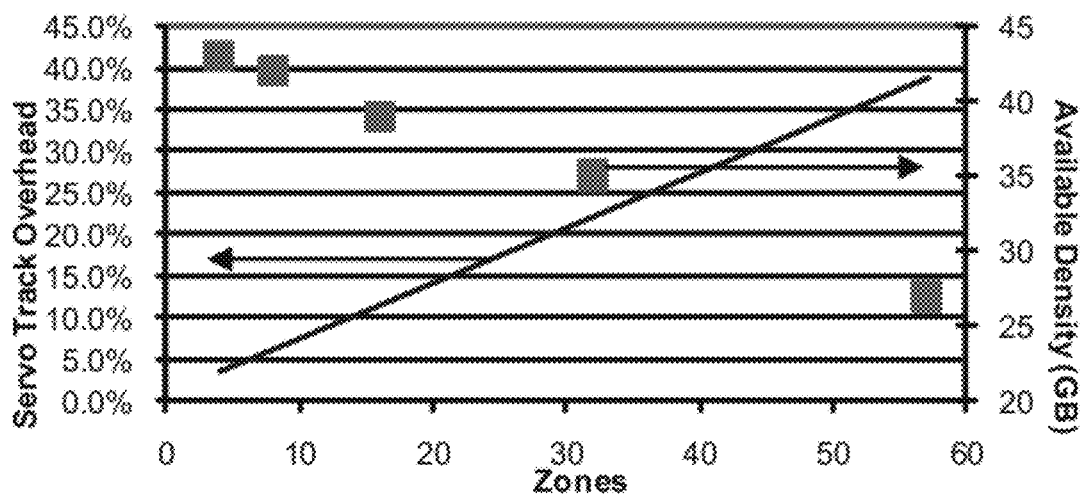
FIG. 7 is a graph showing the reduction in data capacity due to increased number of data zones; the corresponding servo track overhead percentages are also shown.

Also as D increases, the available capacity decreases as more overhead in the form of servo and synchronizing regions, must be added in between the data zones of the subdivided tracks. These are represented by the hatched areas in FIG. 5. This overhead is highly dependent on the architecture of the servo system, but under the track overhead % assumptions shown in FIG. 7, the reduction in the available storage capacity is plotted as the square dots in FIG. 7.

Figure 8:
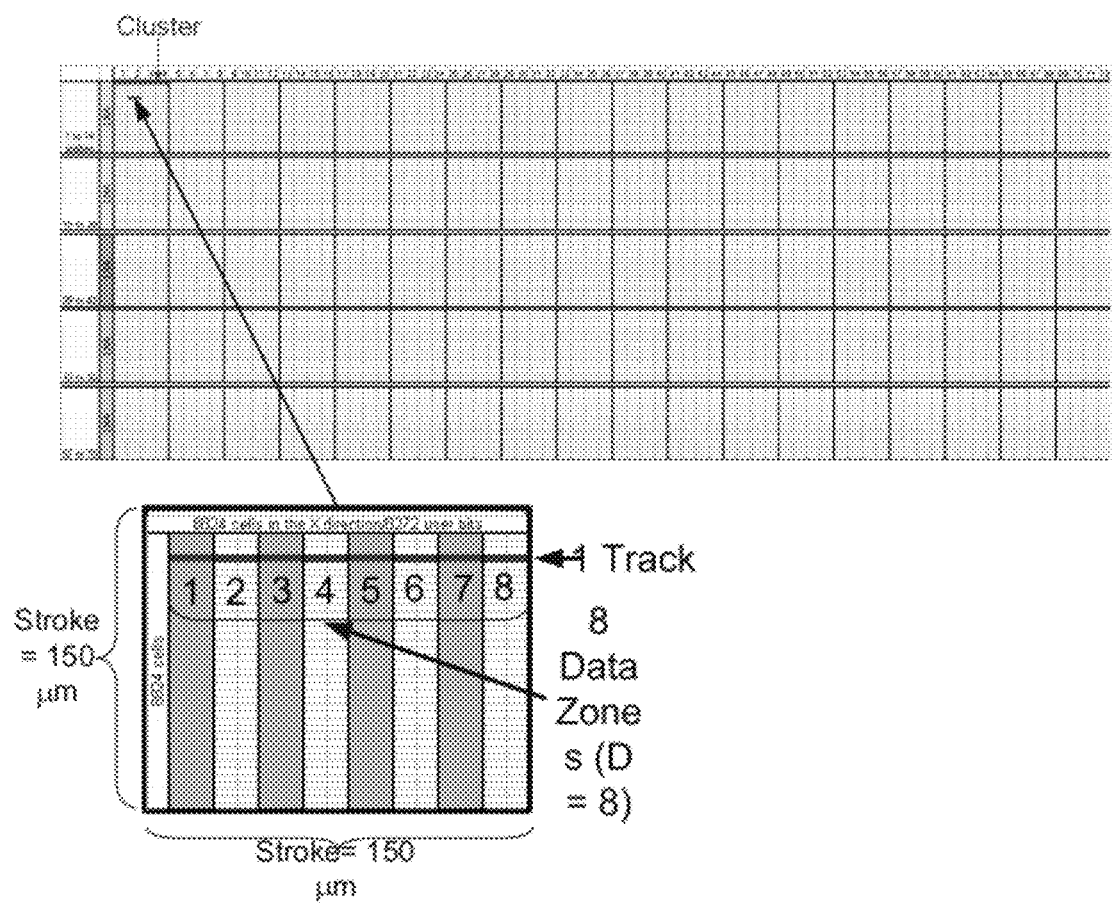
FIG. 8 illustrates a hierarchical organization of probes and channels.

Referring now to FIG. 8, depending on the workload and the size of a data request, a dynamic grouping of the cantilevers is desirable. Fundamentally Parallelism in probe storage amounts to how many data channels are operating simultaneously. The maximum number of simultaneous channels possible is determined by the size of the array of Channel Electronics Blocks (CHEB) that can fit in the CMOS chip on which the probe tips are subsequently fabricated. The size of a CHEB is governed by the Signal to Noise ratio required of the Low Noise Amplifiers in the CHEB, power, and the complexity of the high voltage electronics for probe tip control and the signal processing electronics. On the other hand the number of probes ($N^2$ in FIG. 4) is primarily determined by the stroke of the X-Y moving platform (maximum relative motion between the probe tip and media).

For example if the media size L×L and the stroke is S×S, the total number of cantilevers needed to scan (or tile) the entire media is $N^2=(L/S)^2$ Because the maximum number of channels and probes that can be accommodated are governed by different reasons, there must be an efficient way to map all the probes to the channels. Typically there are far more probes than channels and hence a group of probes must be multiplexed into one channel so that one particular probe is associated with one channel. If the area of a CHEB is A and the stroke is S, the number of probes that can be tiled on one CHEB is $A/S^2$. Also there needs to be a control mechanism that ensures that all probes not being used are disengaged from the media so that a channel is only receiving data from one probe at a time.

In the case of a probe storage device the mechanism of engaging/disengaging is to cause the probe tip to contact or not contact the media as data can only accessed when the tip is in contact with the media. This signal to engage/disengage (commonly known as a "word line" in semiconductor memories) also needs to architected carefully. In one extreme each probe is independently controllable (requiring $N^2$ word lines) whereas in the other extreme all the probes are controlled together (one word line). Clearly the ideal situation will be somewhere in between. A mapping strategy is illustrated previously in FIG. 4.

As an example if one word line engages W cantilevers at a time (call this one cluster), and one cantilever minimum read is 1/D KB (where D is the number of data zones in one track as defined in FIG. 8 and it is assumed that one track stores 1 KB of data at a bit pitch of 17 nm), then to read a 4 KB request, 4D channels or cantilevers must be used, corresponding to INT(0.5+4D/W) clusters. Likewise, for an 8 KB request INT (0.5+8D/W) clusters are used. The parallelism is determined by the number of channels being simultaneously being used, whereas the number of clusters determines the granularity of the parallelism.

For example suppose a particular request needs 64 channels and cluster size is also 64. This means that one control signal actuates all 64 cantilevers which read out the data in parallel. Now suppose another request only needs 16 channels. Since the cluster size is still 64, 48 channels must go unused. However if the cluster size were 16, then those 48 channels (which now correspond to three additional clusters) could be independently used, for example, for overlapping writes. Ideally a dynamically programmable cluster size, optimized for a given request is most desirable, but may not always be feasible due to the driver and routing limitations in the chip. The most desirable then would be the smallest cluster size that is compatible with the die size and routing limitations.

Figure 9:
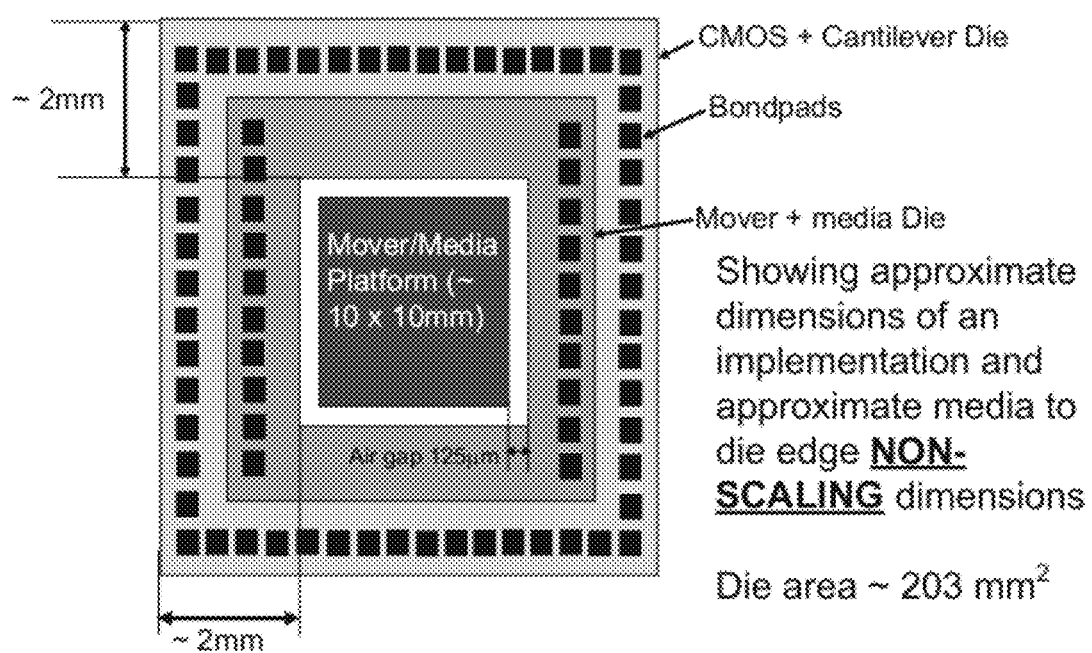
FIG. 9 is a highly simplified top view of a SPP device offered to illustrate possible dimensions.
Figure 10:
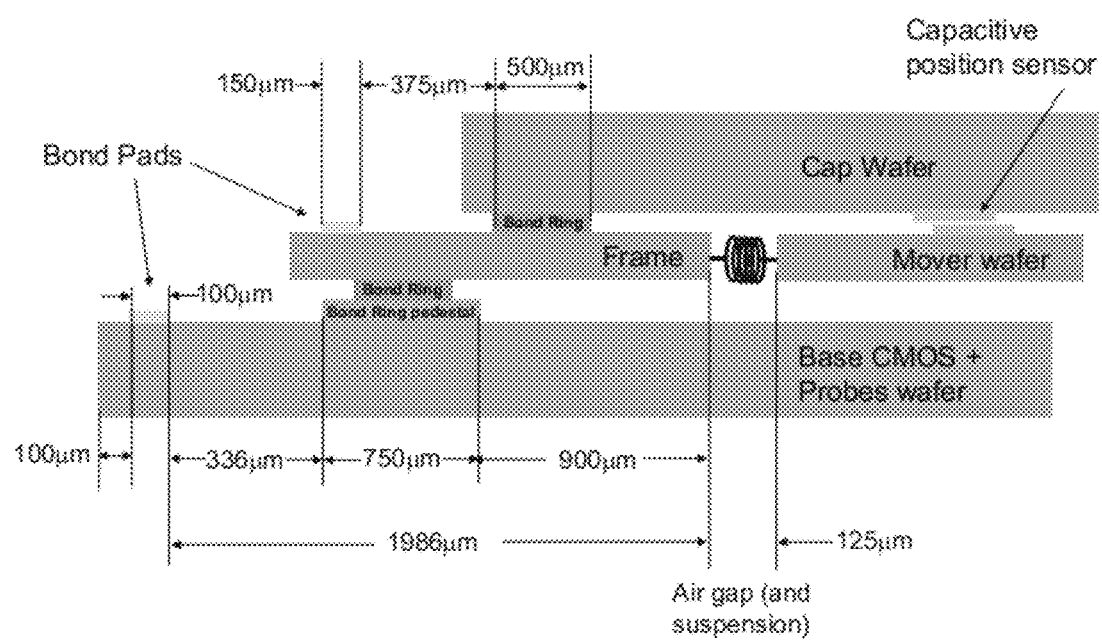
FIG. 10 is a half-cross-sectional side view of the SPP device shown in FIG. 9.

FIG. 9 is a greatly simplified top view of a typical SPP device to illustrate the approximate dimensions. The device is basically square and comprises a 10×10 mm mover surrounded by a frame. FIG. 10 illustrates half of a cross-sectional view of the SPP device which includes a base CMOS wafer supporting a frame and covered with a cap to protect the mover and other components. The current architecture uses a magnetically actuated storage media platform or mover, with a size of approximately 10 mm×10 mm. The mass of this platform ranges from ~25 mg (150 µm thick silicon) to >50 mg (400 µm thick silicon with mass reduction etches). Such a high mass puts restrictions on the acceleration of the platform for a given peak driving current and power dissipation.

Figure 11:
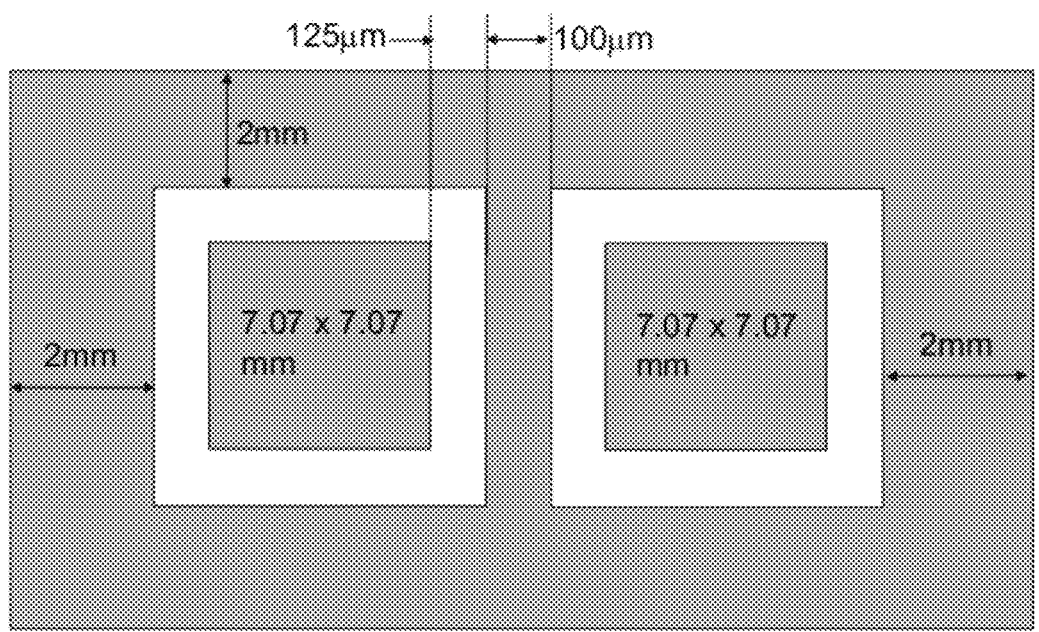
FIG. 11 is a block diagram illustrating splitting a single stage into two smaller stages (i.e. two smaller movers as opposed to one large mover)

As shown in FIG. 11, embodiments comprise splitting a single stage into multiple stages (or cores). One benefit from doing this is improved effective random seek time since two smaller movers are simultaneously seeking independently of each other. Hence under the most favorable conditions, the effective IOPS could be doubled for the same operating power. Two smaller movers, mandate the driving solenoids on the mover backside and the corresponding magnets on the cap chip also shrink linearly in size. This means the magnetic Lorentz force is also reduced in proportion for the same drive current, but the force constant (force/unit mass) remains the same as before giving the same acceleration. However the smaller coils have correspondingly smaller resistance and lead to lower power per core. If the shrink factor is $\alpha$ and the force constant is unchanged, and power before shrink is P, then the new power for two cores after the shrink is $2P(1-\alpha)$. If $\alpha=0.3$ then the new total power for two cores is 1.4P for 2× the IOPS. Hence the IOPS/Watt improves by 43%. Furthermore, if a higher power can be tolerated a higher current can be used to increase the acceleration and lead to overall lower seek times. In other words, embodiments split a single mover into two movers side by side (multicore) each having half the capacity of the larger mover. Similarly, this could be extended to 4 movers in one die, each with ¼ of the capacity of a single mover leading the further improvements in IOPS/watt. As shown in FIG. 11, rather than having one mover 10×10 mm, two ~7×7 mm movers side by side and associated hardware do not appreciably increase the size of the device, but leads to enhanced IOPS/watt and gives a higher degree of flexibility to trade off power with performance. The limit to haw far this can be taken (how small a core can be and how many) is largely determined by how small the magnets can scaled to, to provide the magnetic force. In addition as some point the additional overhead (dead space) between the cores becomes excessive and leads to increased die size and cost. A tradeoff of the cost/performance will indicate the viability any given number of cores. Of course each core could be separate chip in its own right, but in this case each core will require its own package.

The major performance difference between semiconductor Non volatile memory (e.g. NAND) based storage and probe storage is in the reads. Whereas for semiconductor devices, read data rates can be in >40 Mbytes/Sec per chip (channel), the data rate for one complete probe storage device is typically limited by the scan speed to ~20 Mbytes/sec. This can be linearly improved with several probe storage devices working in parallel, but this mandates the higher capacity of the several devices, that the end application may not need.

Figure 12:
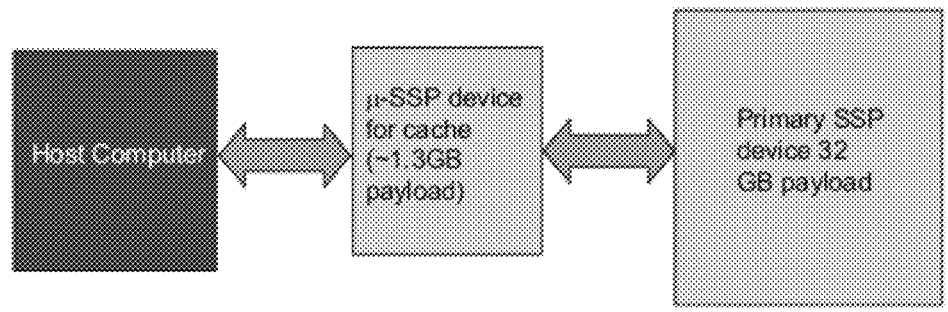
FIG. 12 is a block diagram showing a system where the SPP memory device is paired with a non-volatile semiconductor cache memory and a host computer.

As shown in FIG. 12, one way to improve the performance is to include a non volatile semiconductor cache (e.g. NAND or Phase Change memory) at the front end of the probe storage device. In this way, the read speeds could be improved, by storing the most frequently accessed data in the cache. However this approach ads cost to the total solution. Another way is the fabricate this cache itself as an small agile probe storage device using an electrostatic mover. For very small movers (<2 mm in size), an electrostatic mover is far more efficient and can lead to dramatically increased accelerations (up to an order of magnitude higher). This probe storage cache could therefore potentially dramatically increase the performance. Since this cache will have a very small die size with capacities on the order of several GB, the cost/GB would be much lower than semiconductor caches.

Further, as an additional advantage of parallelism, each cantilever tip may have independent Read/Write control. This means that in principle, while a group of tips is reading a request of a certain size, the remainder of the cantilevers in the group, could be writing an incoming request. The overlap of read and write is a particular advantage of the SSP over solid state memories.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus, comprising:
   a movable sled
   a data storage media on the sled;
   a plurality of probes to scan over the data storage media to perform read and write operations,
   wherein the data storage media is organized in tracks and the tracks are further subdivided into a plurality of data zones D, wherein each probe only scans 1/D of the track.

2. The apparatus as recited in claim 1 wherein D probes are used in parallel.

3. The apparatus as recited in claim 2 wherein the number of data zones D is 20 or less.

4. The apparatus as recited in claim 1, further comprising:
   a plurality of synchronizing regions on a track in between each of the data zones D.

* * * * *